June 6, 1950 — R. H. MULTHAUP — 2,510,753

APPARATUS FOR CONTROLLING GAS TURBINE LOCOMOTIVES

Filed April 8, 1949 — 2 Sheets-Sheet 1

Fig.1

Inventor
Robert H. Multhaup
By
Brown, Critchlow, Flick & Peckham
his Attorneys

June 6, 1950 R. H. MULTHAUP 2,510,753
APPARATUS FOR CONTROLLING GAS TURBINE LOCOMOTIVES
Filed April 8, 1949 2 Sheets-Sheet 2
Fig. 2
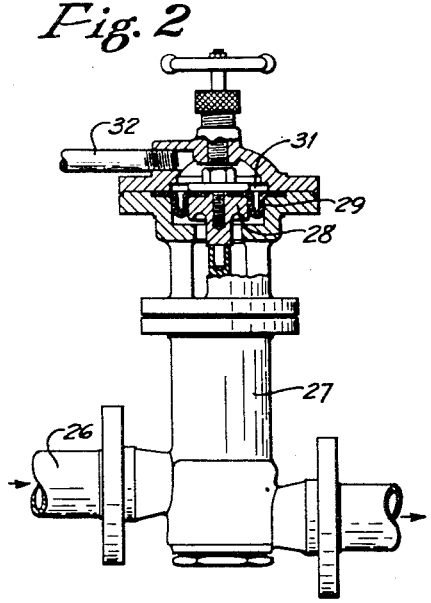
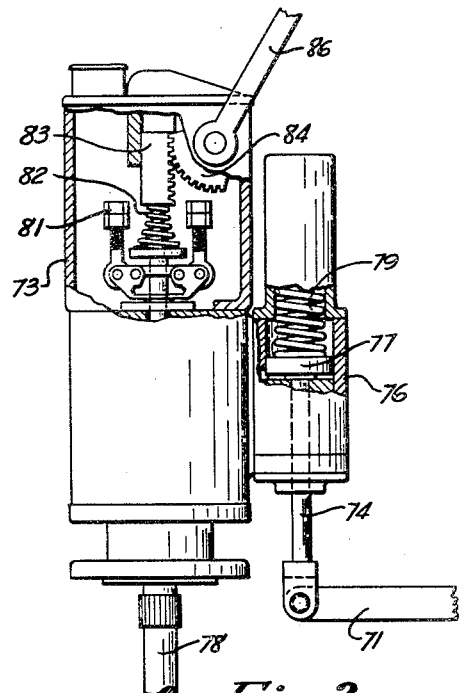
Fig. 3
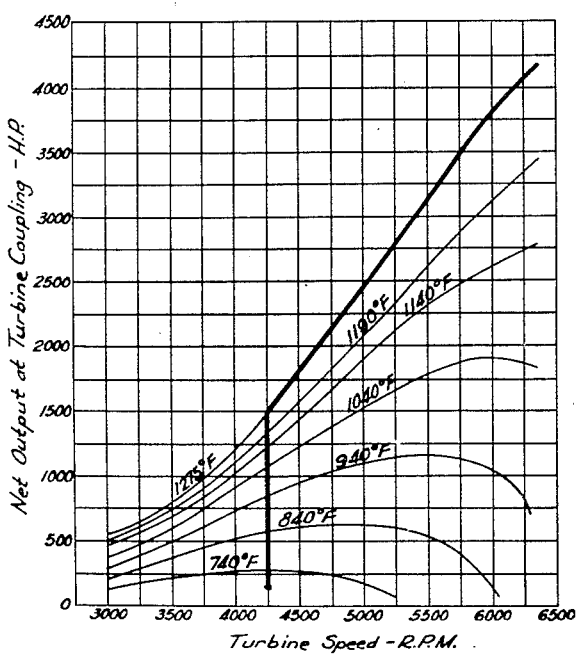
Fig. 4
Inventor
Robert H. Multhaup
By
Brown, Critchlow, Flick & Peckham
his Attorneys.

Patented June 6, 1950

2,510,753

UNITED STATES PATENT OFFICE 2,510,753

APPARATUS FOR CONTROLLING GAS TURBINE LOCOMOTIVES

Robert H. Multhaup, Jeannette, Pa., assignor to Elliott Company, Jeannette, Pa., a corporation of Pennsylvania Application April 8, 1949, Serial No. 86,140

5 Claims. (Cl. 105—36)

This invention relates to a method and apparatus for controlling a gas turbine power plant that drives an electric generator, more particularly when the electric power from the generator is used for driving a locomotive.

In order to idle a gas turbine plant, it is necessary to reduce the turbine inlet temperature and thereby the turbine speed, or to reduce the turbine speed without reducing its inlet temperature. In the second case it is impractical to reduce the turbine speed to a point where the output will be zero horsepower, because when a gas turbine plant operates at high temperature and low speed the instability range of the centrifugal or axial flow compressor is approached and surging occurs, and further, the time required to accelerate the power plant from idling to full load speed is greater since more power is required, owing to the inertia effects of the rotating elements when accelerating from a lower speed to the maximum speed. Therefore, in the past it has been the practice to reduce both temperature and speed until zero horsepower is developed, and for power operation both temperature and speed have been increased together from idling to full load. A gas turbine plant that operates at variable temperature as well as variable speed over its load range has a reduced thermal efficiency.

It is among the objects of this invention to provide a method and apparatus for controlling a gas turbine power plant by which the abovementioned disadvantages under idling conditions are avoided, by which the operating temperature of the gas turbine is raised to the design value as rapidly as possible during power operation, by which the gas turbine power plant can be operated at constant design temperature and variable speed over the maximum portion of its load range, by which control is effected principally by pneumatic pressure, and which utilizes dynamic braking when the power plant is employed in connection with a locomotive.

In accordance with this invention, the rate at which fuel is supplied to the combustion chamber of a gas turbine plant during idling is automatically regulated by the speed of the gas turbine, such as through a governor. During idling the inlet temperature is kept relatively low in this manner, and the gas turbine operates at a medium speed. For power operation, the automatic regulation of the fuel rate in accordance with the gas turbine speed is discontinued and the fuel rate is increased by advancing a throttle. This raises the gas turbine inlet temperature. At the same time, sufficient excitation is automatically put on the electric generator driven by the gas turbine so as to load the gas turbine plant in order to keep the speed of the plant constant at the idling speed setting. This excitation may be under the control of the governor. After the temperature has reached a predetermined maximum, the throttle continues to be advanced a desired amount but the temperature is held at the aforesaid maximum by thermostatically retarding the fuel rate. Simultaneously, the excitation of the generator is reduced in order to momentarily unload the gas turbine plant to permit the gas turbine to reach a higher operating speed. The turbine is kept from exceeding the higher speed by again increasing excitation of the generator, thus increasing the load on the plant until the gas turbine is developing the maximum horsepower that it can develop at the predetermined temperature and higher speed. The changes in fuel rate and generator excitation are initiated by changes in air pressure that is controlled by the throttle, the governor, temperature-responsive means, and some electrically operated valves in the fluid pressure lines. For dynamic braking, throttle regulation of the fuel rate is discontinued and it is controlled thermostatically to maintain a predetermined turbine inlet temperature. At the same time excitation is put on the motor which normally drives a wheel of the locomotive, but which now is driven by the wheel as a generator. The electric power thus developed drives the generator as a motor which, in turn, feeds back power into the gas turbine plant. As this power increases, due to more excitation being put on the motor, some of the compressed air from the compressor is vented to the atmosphere automatically in order to dissipate the developed power.

The preferred embodiment of the invention is illustrated in the accompanying drawings, in which Fig. 1 is a diagrammatic layout of the control system; Figs. 2 and 3 are side views, partly broken away, of the fuel valve and the governor, respectively; and Fig. 4 is a chart illustrating the control method disclosed herein.

Referring to Fig. 1 of the drawings, in which the control system is shown under idling conditions, each of the driving wheels 1 of a locomotive is driven by an electric motor 2 which receives its electrical power through wires 3 from an electric generator 4. For convenience, only one wheel is shown. The generator is provided with an exciter 6 that is adjustable by a rheostat 7. This exciter is driven through gears or V-belts 8 from the generator shaft 9 which also drives a dynamic braking exciter 11 that is controlled by a rheostat 12 as will be explained later. The dynamic braking exciter is electrically connected by wires 13 to the electric motor 2. The generator 4 is driven by a shaft 14 from a reduction gear unit 16 that is driven from the shaft 17 of an air compressor 18. This shaft and air compressor are driven by a gas turbine 19. The compressor delivers compressed air through a conduit 21 and a regenerator 22 to a combustion chamber 23 communicating at one end with the inlet of the turbine.

The opposite end of the combustion chamber is provided with a burner 24, preferably an oil burner, to which oil is supplied through a pipe 26 controlled by a fuel regulating valve 27. This valve is a conventional fluid pressure controlled valve in which the movable valve member is moved downward to open the valve wider. As shown in Fig. 2, this is accomplished by a piston 28 and diaphragm 29 which form the bottom of a chamber 31 connected to a fluid pressure line 32 through which fluid, such as air, is supplied under pressure. The greater the air pressure delivered to the chamber, the farther the piston will be depressed and the wider the valve will be opened for flow of fuel to the burner.

The air line 32 to the fuel valve is connected to one outlet of a normally deenergized three-way solenoid valve 33. When the valve is deenergized, this air line communicates through the valve (as shown in broken lines) with the valve inlet which is connected by a pipe 34 to an outlet in the side of a fluid pressure controlled valve 36, referred to herein as a fuel totalizer. This totalizer is a conventional pneumatic relay valve which adds and subtracts pressures received from external sources. The end of the totalizer adjacent its outlet, just referred to, is provided with an inlet port 37 that is connected with a pipe 38 leading from a high pressure pipe 39 connected to an air reservoir 40. Air in this reservoir is maintained at a pressure of about seventy pounds per square inch by means of the air brake compressor system of the locomotive.

The inlet port 37 of the totalizer is controlled by a valve member 41 on the outer end of a horizontal stem 42, the inner end of which engages a diaphragm 43 that extends across the valve housing. The diaphragm is urged away from the inlet port by means of a coil spring 44 in order to bias the valve toward closed position. The diaphragm is connected by a rod 46 with two other similar diaphragms 47 and 48. The different diaphragms are separated by partitions 49 and 50 to form chambers 52, 53, 54, and 55. The central portions of the diaphragms and partitions are connected by bellows 57 that encircle rod 46 which extends loosely through the partitions. Each chamber is provided with a port for connection to different air pressure lines as will be described presently.

The totalizer chamber 52 is connected by a pipe 58 to a pipe 59 leading from the cylinder of a throttle valve 61 that is connected to high pressure pipe 39. The throttle valve may be a conventional cam operated valve provided with a projecting longitudinally movable valve stem 62 that is adapted to be moved into the valve cylinder by means of a cam 63 rotatable by a hand lever on throttle 64. The farther the stem is moved into the valve, the greater the air pressure delivered by the valve to pipe 59. The valve and its operating lever 64 form parts of the master controller for the entire system. The valve is set to deliver a predetermined minimum loading pressure even when its stem is in its outermost position, which is idling position. In one application of this system the minimum setting is thirteen pounds pressure, which is about what is required for idling operation under the worst operating conditions; i. e., a very hot day. This pressure, exerted in chamber 52 against the first diaphragm 43 in the fuel totalizer, flexes the diaphragm to the right and thereby opens inlet port 37 so that air pressure from pipe 38 will be delivered through pipes 34 and 32 to fuel valve 27 for holding it open a slight amount. However, thirteen pounds loading pressure from the master controller would cause the fuel valve to be opened too much for normal temperature days, so normally this pressure is counteracted the necessary amount by air pressure delivered to the second chamber 53 in the totalizer through a pipe 66 connected to the outlet of another throttle valve 67, called a pressure sender. The air pressure in chamber 53 flexes the middle diaphragm 47 to the left and thereby keeps the inlet port 37 from being opened as wide as otherwise would be the case. This reduces the air pressure delivered to the fuel valve 27 the necessary amount for idling.

The inlet to pressure sender 67 is connected by a pipe 68 to pipe 38. When the vertically movable valve stem 69 of the pressure sender is in its uppermost position, this valve 67 is closed. The vertical position of the stem is determined by a lever 71 which bears on its upper end and is connected by a bracket 72 to the housing of an isochronous speed governor 73. The lever is pivotally connected to the lower end of a piston rod 74 that extends up into a cylinder 76 in the governor housing. As shown in Fig. 3, the cylinder is provided with a piston 77 on its upper end. The governor is a conventional mechanism which includes a rotary pump (not shown) that is driven by a shaft 78 connected to reduction gear unit 16 so that the pump is always synchronized with the speed of the turbine and generator. The pump pumps oil into the cylinder to move the piston upward when pump shaft 78 starts to slow down, whereupon the pressure sender starts to close. If the pump shaft starts to speed up, the governor piston will be moved downward by a coil spring 79 above it. The delivery of oil to and from the cylinder is controlled automatically by flyballs 81 which are rotated by the pump shaft and which swing outward as the speed of the shaft increases. The distance that the flyballs can swing outward for any given speed is controlled by a coil spring 82 that can be compressed by a vertically movable rack 83 engaged by a gear segment 84 which is turned by a lever 86 outside of the governor housing. As this lever is moved back and forth, the amount of pressure on the upper end of spring 82 is varied. Increased pressure on top of the spring requires pump shaft 78 to rotate faster in order to swing the flyballs outward a given distance. This means that the turbine will be allowed to operate at a higher speed than previously, before the governor piston and piston rod will start to move downward to reduce the fuel supply to the turbine.

The lever 86 that controls gear segment 84 is connected by a link 87 to another lever 88 which can be swung back and forth by a stem 89 projecting from the housing of a speed setting positioner 91. The position of the stem is controlled by a diaphragm 92 which is moved by air pressure behind it when that pressure is increased to a predetermined value sufficient to overcome the resistance of a coil spring 90. The pressure is supplied through a pipe 93 from a normally deenergized three-way solenoid valve 94. When deenergized, the valve has an inlet connected by a pipe 96 with one outlet of a three-way solenoid valve 97 that is deenergized during idling operation. At that time the valve connects pipe 96 with its exhaust 98, so that no pressure is exerted on the speed setting positioner 91 during idling. The inlet of this valve 97 is connected to pipe 59 from the master controller.

For idling operation, the speed setting positioner 91 is set to adjust the governor 73 so that enough fuel will be delivered to the burner to permit the turbine to operate at a predetermined idling speed, preferably 4250 revolutions per minute. If the turbine attempts to go faster, the governor will depress the stem of the pressure sender 67 farther and thereby increase the air pressure in chamber 53 of the fuel totalizer 36 enough to close its inlet port 37 sufficiently to further reduce the air pressure on the fuel valve 27. The reduction will be such that the fuel delivered to the burner 24 will be reduced to the point where the turbine will be brought down to idling speed. On the other hand, if the turbine starts to slow down, the governor will allow the pressure sender 67 to close so that the inlet port of the fuel totalizer will be opened farther. The temperature at the turbine inlet necessary to maintain an idling speed of 4250 revolutions per minute in this particular plant is about 700° F.

It should be understood from the description thus far that during idling operation of the turbine the fuel rate is controlled only by the governor, and the fuel rate controls the speed of the turbine. The fuel rate is controlled by the governor because the minimum loading pressure from the master controller is great enough to set a fuel rate in excess of that required to hold the turbine down to the idling speed for which the governor is set, so the fuel rate is cut back by the fuel totalizer 36, due to air pressure being delivered to its chamber 53 from pressure sender 67 controlled by the governor.

It will be observed that pipe 66 from the pressure sender is connected by a branch pipe 101 to a chamber 102 at one side of a flexible diaphragm 103 in a throttle valve 104, called an excitation repeater. The diaphragm is urged to the left by a coil spring 106 which encircles the stem of a valve member 107 that controls an inlet port 108. On the same side of the diaphragm the valve is provided with an outlet connected by a pipe 109 to chamber 54 of the fuel totalizer. Inlet port 108 communicates through a pipe 111 with one outlet of a three-way solenoid valve 112. The inlet of the solenoid valve is connected by a pipe 113 to high pressure line 39. Pipe 113 is provided with a reducing valve 114 which, preferably, is set to reduce the pressure to 30 pounds per square inch. During idling operation no air pressure is delivered through pipe 109 to the fuel totalizer 36 because at that time valve 112 is deenergized so that pipe 113 is closed by the valve, and pipe 111 is connected with the valve exhaust 116.

Pipe 109 is connected by a branch pipe 117 to one inlet of a three-way solenoid valve 118. The other inlet of this valve is connected by a pipe 119 to pipe 59. The outlet of the valve is connected by a pipe 121 to one end of the cylinder of an excitation positioner 122. The cylinder contains a plunger provided with a projecting rod 123 that operates the movable contact member 124 of generator exciter rheostat 7. The opposite end of the excitation positioner is connected to an extension of high pressure line 39. During idling and power operation of this plant the valve 118 is deenergized so that it connects pipes 117 and 121. However, as the excitation repeater 104 is inactive during idling, no excitation is placed on the generator at that time.

When the locomotive engineman wishes to start the locomotive moving ahead he moves the throttle 64 to the left from the idling position shown. As the throttle is advanced from idling position, a projection on cam 63 closes an electric switch 125 which energizes an electric circuit that opens valves 97 and 112. Opening of the second valve will make excitation repeater 104 active and thereby, through excitation positioner 122, place some excitation on the generator. The amount of excitation will be small at first because, under idling conditions, the air pressure in chamber 102 of the excitation repeater is low. As the throttle is advanced, the increasing pressure from throttle valve 61 is transmitted through pipes 59 and 58 to chamber 52 of fuel totalizer 36 where it opens inlet port 37 wider and thus causes the air pressure in fuel regulating valve 27 to be increased so that the fuel rate to the burner will increase. The governor will not adjust the fuel rate, as was the case during idling, because the air pressure from the excitation repeater 104 is delivered through pipe 109 to chamber 54 of the fuel totalizer where it will balance the pressure in chamber 53, thereby leaving the totalizer under the control of the air pressure in chamber 52. To permit added increase or decrease in fuel rate during transient conditions, pipe 109 may be provided with a choke 126 and volume 127.

During this initial operating phase the loading pressure from throttle valve 61 is transmitted to the speed setting positioner 91, but that device is not affected by the pressure because an initial loading on it by spring 90 will hold it stationary until the loading pressure from valve 61 reaches the point where it will produce a fuel rate that will give top turbine inlet temperature, preferably 1275° F., at idling speed. Until that temperature is reached at the turbine inlet, the governor speed setting will remain at 4250 revolutions per minute and the governor will maintain that turbine speed by varying the excitation on generator 4. In other words, when the turbine attempts to go faster, the governor depresses the stem 69 of pressure sender 67 and thereby admits more air pressure to excitation repeater 104. This opens the inlet 108 of the repeater wider and thereby increases the air pressure to excitation positioner 122 which, in turn, through rheostat 7, increases the excitation on the generator, placing as much load on the generator as the plant will carry at the predetermined minimum speed and maximum temperature.

When the desired maximum temperature for the turbine is reached, it is held at that point by means of thermostat valves which automatically control the fuel totalizer 36. One thermostat 130 is operated by the turbine inlet temperature. The other thermostat 131 is operated by the ambient temperature. The inlet of thermostat valve 130 is connected to the end of pipe 38, while its outlet is connected by a pipe 132 to a chamber 133 in a throttle valve 134, called a temperature regulator. This chamber is separated from the inlet port 136 of the valve by a flexible diaphragm 137. The diaphragm is urged toward a central partition 138 in the valve by means of a coil spring 139 which encircles the stem of a valve member 141. On the other side of the partition another chamber 142 is formed by a flexible diaphragm 143 which is urged toward the central partition by an adjustable coil spring 144. The central portions of the two diaphragms are rigidly connected by a rod 146 extending through an opening in the partition and encircled by bellows 147 connected to the partition and the two diaphragms. The inlet port 136 communicates with a pipe 148 connected to pipe 38. Chamber 142 is connected by a pipe 149 with the outlet of thermostat valve 131. The inlet of this valve is connected by a pipe 151 to pipe 38. The temperature regulator 134 has outlets near its opposite ends, one being connected by a pipe 152 with chamber 55 of fuel totalizer 36, and the other being connected by a short pipe 153 to pipe 152.

The initial loading by spring 144 on diaphragm 143 in the temperature regulator is five pounds per square inch. Above an ambient temperature of 70° F., the ambient thermostat 131, which preferably starts to open at minus 30° F., delivers a pressure of 60 pounds per square inch to chamber 142 of the temperature regulator. Therefore, the turbine thermostat 130 must deliver a pressure exceeding 55 pounds per square inch to chamber 133 before inlet port 136 can start to open and transmit pressure to chamber 55 of the fuel totalizer for a fuel cutback. The turbine thermostat preferably is set to remain closed until the turbine inlet temperature reaches about 1000° F., and to transmit a pressure of 55 pounds per square inch by the time the inlet temperature reaches 1275° F.

As ambient temperatures drop, the power output of the plant increases at such a rate that a limit must be set to protect the reduction gear and electrical equipment. This is accomplished by operating at reduced inlet turbine temperatures under the control of ambient thermostat 131. Thus, as the ambient temperature decreases, the output pressure from the ambient thermostat will decrease and thus lower the pressure level at which the temperature regulator 134 starts to cut back the fuel. It also should be noted that the temperature regulator is equipped with a choke 154 and a volume 155 set at the approximate time delay of the turbine thermostat. This choke and volume are located in pipe 152 near the temperature regulator so that positive cutback control can be obtained.

After the turbine has reached top temperature, any further advance of throttle 64 will cause a pressure increase in pipe 59 that not only will set a higher fuel rate, but also will actuate the speed setting positioner 91 so that the governor will be allowed to operate faster before it will start to depress stem 69 of the pressure sender. When the speed setting of the governor is increased in this way, the pressure sender stem 69 is allowed to rise temporarily. This reduces the pressure transmitted to the excitation repeater 104 and the excitation positioner 122 so that excitation on the generator is reduced transiently, thereby allowing the turbine to speed up to the higher speed for which the governor is now set. The turbine is prevented from exceeding that speed and running away, because any such tendency will cause the governor to increase the excitation on the generator and thereby increase the load on the turbine. Due to the fact that the loading pressure from valve 61 is great enough to produce a fuel rate greater than required to maintain the top temperature of the turbine, so that the turbine will try to go faster than the governor will allow, the governor will keep increasing the load on the generator until the turbine is developing the maximum horsepower that it can develop at maximum turbine temperature and the speed for which the governor is set.

In order to dynamically brake the locomotive, the master controller handle or throttle 64 is moved back to idling position, thereby opening electric switch 125, and then it is unlatched and moved in the opposite direction (to the right) where it closes an electric switch 160 that completes a circuit that energizes solenoid valves 33, 94, 118, and 161. Valve 94 shuts off the air pressure from valve 61 to the speed setting positioner 91 and connects the latter with a pipe 162 connected to a pipe 163 leading from high pressure pipe line 39. Pipe 162 is provided with a reducing valve 164 that will reduce the pressure on the speed setting positioner to a point where it will set the speed on the governor for a preferable turbine speed of 5000 revolutions per minute. The fuel totalizer 36 and the excitation repeater 104 are rendered ineffective by valves 33 and 118 which shut off pipes 34 and 117, respectively.

As the throttle advances toward the right, cam 63 depresses stem 165 of a normally closed throttle valve 166 which thereby admits air pressure to a pipe 167 that transmits it to one end of a dynamic braking excitation positioner 168. This sets up the amount of braking power that must be absorbed. The motors 2, now driven by the locomotive wheels and acting as generators, start to drive generator 18 as a motor which drives the compressor 18 with the help of the turbine. The braking power thus is absorbed by the compressor. During this period the temperature of the turbine is maintained between 800° and 900° F. by means of a third thermostat valve 169 whose inlet is connected to pipe 163.

At 800° F., the output pressure from the dynamic braking thermostat 169 is zero and increases approximately linearly until at 900° F. the output pressure is sixty pounds per square inch gauge. The outlet of the thermostat valve 169 is connected by a pipe 170 with a chamber 171 in a dynamic braking reversing totalizer valve 172. One side of the chamber is formed by a flexible diaphragm 173 that is urged toward the opposite side 174 of the chamber by an adjustable spring 175 set at an equivalent air pressure of sixty pounds per square inch gauge. The diaphragm is connected by a stem 176 with a valve member 177 that controls an inlet port 178 in communication with pipe 38. The space between the partition 174 and inlet port is connected by a pipe 181 to the second inlet of solenoid valve 33. During dynamic braking, if the turbine temperature falls below 800° F. the pressure from the thermostatic valve 169 transmitted to chamber 171 of the reversing totalizer 172 will be zero, so spring 175 will urge valve member 177 to full open position. This will permit maximum air pressure to be transmitted from pipe 38 through pipe 181 to the second inlet of solenoid valve 33 and through pipe 32 to the fuel valve 27 to produce maximum fuel rate for raising the turbine temperature. As the turbine temperature rises, however, thermostatic valve 169 will increase its output pressure which will act against the sixty pound spring 175 in reversing totalizer 172 to close the inlet port 178, thus decreasing the pressure in pipe 181 and eventually the pressure to fuel valve 27. This will reduce the fuel rate and retard the inlet temperature of the gas turbine.

To increase the braking power, the help that the turbine gives to generator 4 in driving the compressor must be reduced. This is accomplished by dumping air through a valve 183 from conduit 21 connected to the compressor, so that the generator has to work harder in driving the compressor to make up for the reduced turbine output. As the controller handle 64 is advanced farther to the right, more braking power must be absorbed because more excitation is put on motor 2 by exciter 11, so that it delivers more electric power to the generator which acts as a motor. The increased braking power tends to speed up the turbine, but the governor 73, which controls the dump valve 183, sends out an increasing pressure that opens that valve farther and thereby dissipates more energy in order to hold the turbine at constant speed.

The dump valve is actuated by a valve positioner 185 which is controlled by air pressure. One end of the positioner is connected by a pipe 186 to high pressure line 39 to normally hold the dump valve closed. The valve positioner is actuated in the opposite direction by air pressure from a pipe 187 connected to one outlet of the three-way solenoid valve 161. Normally, this valve is deenergized so that pipe 187 is connected only with the valve's exhaust 188. During dynamic braking, this valve is energized and pipe 187 is connected with the valve inlet which is connected by pipe 189 with pipe 66 from pressure sender 67. Consequently, when the governor starts to speed up and depress stem 69, the air pressure transmitted to valve positioner 185 is increased, with the result that the dump valve 183 is opened so that the plant will absorb more power and thereby slow down the locomotive.

Idling and power operation of the plant in accordance with the invention is illustrated graphically in Fig. 4. The speed and output in horsepower of the plant is indicated by the heavy line with the vertical and inclined portions. When the plant is idling, as indicated in Fig. 1, the inlet temperature of the turbine is approximately 700° F., and its speed is 4250 revolutions per minute. At this speed the horsepower developed by the turbine is very low; only sufficient to overcome parasitic losses and drive auxiliary loads. As the throttle is advanced, the turbine inlet temperature rises to 1275° F., as shown by the vertical portion of the heavy line, but the speed of the turbine remains at 4250 R. P. M. because of the increasing electrical load being put on the generator, explained earlier herein. The turbine now is developing 1500 horsepower, which is at the lower end of its load range. Further increase in temperature is prevented, except for normal fluctuations, by the turbine inlet thermostat 130. Continued advance of the throttle will increase the speed setting of the governor so that the turbine speed can increase at the maximum temperature until the turbine is developing the maximum horsepower that it can develop at that particular speed and temperature. This is shown by the inclined portion of the heavy line, which, it will be noted, coincides with the 1275° F. temperature line. The upper end of the heavy line rises above 4000 horsepower when the turbine speed exceeds 6200 R. P. M.

This graph shows that at idling speed the inlet temperature of the turbine is relatively low, but that for power operation it is increased to maximum design temperature as rapidly as possible by holding the turbine speed constant. Then, throughout the load range, the temperature remains constant for maximum thermal efficiency while the speed of the turbine is varied in accordance with the load. This system is a big improvement over one in which both temperature and speed are increased from idling to full load.

A pneumatic control system is extremely simple, as compared with a hydraulic system which requires a liquid reservoir, pumps, etc. Other than the governor, my pneumatic system requires no rotating parts. Most of the system is made up from valves and diaphragms, which can be rearranged readily to perform other control functions. By simple expedients, such as chokes and volumes, time lags may be introduced into the system to provide proper operational sequence or to dampen undesirable characteristics. With no adjustment of the pneumatic system, the engineman may continue operation in the normal way, insofar as he is concerned, even if one quarter or one half of the traction motors are cut out of the system, because it will automatically compensate for the lower available traction power.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The combination with a combustion chamber communicating with a gas turbine driving an electric generator having an exciter, of a pneumatic control system comprising a compressed air reservoir, a fuel regulating valve for the combustion chamber adapted to be opened by air pressure from the reservoir, an adjustable governor responsive to the speed of the turbine, pneumatically operated means controlled by the governor during idling operation of the turbine for regulating the air pressure delivered to said fuel valve to hold the turbine at a predetermined idling speed, a manually operated throttle valve pneumatically connecting the reservoir with said regulating means, valve means for stopping said control of the regulating means by the governor when the throttle valve is opened wider to increase the air pressure to the regulating means for power operation of the turbine, said pressure regulating means being so formed that said increase in air pressure from the throttle valve causes the regulating means to deliver increased air pressure to the fuel valve, pneumatically operated means controlled by the governor for variably energizing said exciter during said wider opening of the throttle valve so as to maintain the turbine at said idling speed while the turbine inlet temperature rises, temperature-responsive means for retarding the increase in air pressure delivered to the fuel valve during still wider opening of the throttle valve to arrest said temperature rise at a predetermined point, and pneumatically operated adjusting means connected with the governor and actuated by air pressure from the throttle valve during said still wider opening of that valve for raising the speed setting of the governor so that said governor-controlled energizing means will reduce excitation of the generator long enough for the turbine to reach a higher speed determined by the raised speed setting of the governor, whereupon said governor-controlled energizing means will increase the excitation of the generator again to keep the turbine from exceeding said higher speed, the turbine thereby developing the maximum horsepower that it can develop at said predetermined temperature and higher speed.

2. The combination with a combustion chamber communicating with a gas turbine driving an electric generator having an exciter, of a pneumatic control system comprising a compressed air reservoir, a fuel regulating valve for the combustion chamber adapted to be opened by air pressure from the reservoir, an air pressure line connected with the reservoir, an adjustable valve controlling the pressure delivered by said line, an adjustable governor responsive to the speed of the turbine for controlling the adjustable valve, pneumatically operated means controlled by the pressure from said line during idling operation of the turbine for regulating the air pressure delivered to said fuel valve to hold the turbine at a predetermined idling speed, a manually operated throttle valve pneumatically connecting the reservoir with said regulating means, valve means for stopping said control of the regulating means by the governor when the throttle valve is opened wider to increase the air pressure to the regulating means for power operation of the turbine, said pressure regulating means being so formed that said increase in air pressure from the throttle valve causes the regulating means to deliver increased air pressure to the fuel valve, pneumatically operated means controlled by the pressure from said line for variably energizing said exciter during said wider opening of the throttle valve so as to maintain the turbine at said idling speed while the turbine inlet temperature rises, temperature - responsive means pneumatically connected with said pressure regulating means for retarding the increase in air pressure delivered to the fuel valve during still wider opening of the throttle valve to arrest said temperature rise at a predetermined point, and pneumatically operated adjusting means connected with the governor and actuated by air pressure from the throttle valve during said still wider opening of that valve for raising the speed setting of the governor so that said pressure controlled energizing means will reduce excitation of the generator transiently to permit the turbine to reach a higher speed determined by the raised speed setting of the governor, whereupon said pressure controlled energizing means will increase the excitation of the generator again to keep the turbine from exceeding said higher speed, the turbine thereby developing the maximum horsepower that it can develop at said predetermined temperature and higher speed.

3. The combination with a combustion chamber communicating with a gas turbine driving an electric generator having an exciter, of a pneumatic control system comprising an adjustable governor responsive to the speed of the turbine, an air pressure controlled speed setting positioner for the governor, a compressed air reservoir, a manually operated throttle valve connecting the reservoir with said positioner for increasing the speed setting of the governor when the turbine reaches a predetermined maximum temperature, a fuel valve for the combustion chamber, a totalizer valve pneumatically connecting the reservoir with the fuel valve for controlling the latter, a conduit connecting the outlet of the throttle valve with the totalizer to urge it open, a pressure sender valve pneumatically connecting the reservoir with the totalizer to oppose the pressure from said throttle valve while the turbine is at idling temperature, means operatively connecting the governor with the pressure sender to control the operation of the latter, an excitation positioner for controlling the generator exciter, an excitation repeater valve for pneumatically connecting the reservoir with the excitation positioner to control the latter, a conduit connecting the outlet of the pressure sender with the excitation repeater to control the latter, a solenoid valve shutting off communication between the reservoir and the excitation positioner while the turbine is idling, a manually operable electric switch adapted to be actuated when said throttle valve is opened a predetermined amount to open said solenoid valve so that the excitation positioner will become active and hold the speed of the turbine constant as it is brought up to maximum temperature, a conduit connecting the outlet of the excitation repeater with said totalizer to cancel the effect thereon of the pressure from the pressure sender when said solenoid valve is opened, and a thermostat pneumatically connecting the reservoir with said totalizer to oppose the pressure from the throttle valve after said maximum temperature is reached so that when the throttle valve is opened farther the speed of the turbine can increase without the temperature at the turbine rising above said predetermined maximum.

4. In a locomotive in which the wheels are driven by at least one electric motor that obtains its electric power from a generator having an exciter and driven from a gas turbine plant having a combustion chamber communicating with a turbine that drives a compressor, a pneumatic control system comprising an adjustable governor responsive to the speed of the turbine, pneumatically operated means controlled by the governor during idling operation of the turbine for automatically regulating the fuel supply rate to the combustion chamber to hold the turbine at a predetermined idling speed, initially inactive pneumatically operated means adapted to be controlled by the governor during power operation for variably energizing said exciter, master control means adapted to be advanced manually to increase the fuel rate, means for rendering the control of said fuel regulating means by the governor inactive when said master control means is advanced during power operation and for simultaneously rendering governor control of said exciter-energizing means active so as to maintain the turbine at said idling speed while the increased fuel rate raises the turbine inlet temperature, temperature-responsive means for arresting said temperature rise at a predetermined point while said master control means is advanced still more, pneumatically operated means for raising the speed setting of the governor during said last-mentioned advance of the master control means, normally inactive pneumatically operated means for taking the place of said fuel regulating means in regulating the fuel supply rate during dynamic braking of the locomotive, a thermostat responsive to the temperature of the gas turbine plant for controlling said last-mentioned pneumatically operated means, means for maintaining the speed setting of the governor at a predetermined point during dynamic braking, an exciter for the motor, normally inactive pneumatically operated means adapted to be controlled by said master control means during dynamic braking for variably energizing said motor exciter to cause the motor to develop electric power for driving the generator as a motor, a normally closed vent valve for air compressed by the compressor, and normally inactive pneumatically operated means controlled by the governor during dynamic braking for opening the vent valve as the power developed by the motor is increased.

5. In a locomotive in which the wheels are driven by at least one electric motor that obtains its electric power from a generator having an exciter and driver from a gas turbine plant having a combustion chamber communicating with a turbine that drives a compressor, a pneumatic control system comprising a compressed air reservoir, a fuel regulating valve for the combustion chamber adapted to be opened by air pressure from the reservoir, an air pressure line connected with the reservoir, an adjustable valve controlling the pressure delivered by said line, an adjustable governor responsive to the speed of the turbine for controlling the adjustable valve, pneumatically operated means controlled by the pressure from said line during idling operation of the turbine for regulating the air pressure delivered to said fuel valve to hold the turbine at a predetermined idling speed, a manually operated throttle valve pneumatically connecting the reservoir with said regulating means, valve means for stopping said control of the regulating means by the governor when the throttle valve is opened wider to increase the air pressure to the regulating means for power operation of the turbine, said pressure regulating means being so formed that said increase in air pressure from the throttle valve causes the regulating means to deliver increased air pressure to the fuel valve, pneumatically operated means controlled by the pressure from said line for variably energizing said exciter during said wider opening of the throttle valve so as to maintain the turbine at said idling speed while the turbine inlet temperature rises, temperature-responsive means pneumatically connected with said pressure regulating means for retarding the increase in air pressure delivered to the fuel valve during still wider opening of the throttle valve to arrest said tempertaure rise at a predetermined point, and pneumatically operated adjusting means connected with the governor and actuated by air pressure from the throttle valve during said still wider opening of that valve for raising the speed setting of the governor so that said pressure controlled energizing means will reduce excitation of the generator transiently to permit the turbine to reach a higher speed determined by the raised speed setting of the governor, normally inactive pneumatically operated means for regulating the fuel supply rate during dynamic braking of the locomotive, valve means for rendering said last-mentioned fuel regulating means active and said first-mentioned fuel regulating means inactive during dynamic braking, a thermostat responsive to the temperature of the gas turbine plant for controlling said last-mentioned fuel regulating means, means for maintaining the speed setting of the governor at a predetermined point during dynamic braking, an exciter for the motor, normally inactive pneumatically operated means adapted to be controlled manually during dynamic braking for variably energizing said motor exciter to cause the motor to develop electric power for driving the generator as a motor, a normally closed vent valve for air compressed by the compressor, and normally inactive pneumatically operated means controlled from said line during dynamic braking for opening the vent valve as increased power is developed by the motor.

ROBERT H. MULTHAUP.

REFERENCES CITED

The following references are of record in the file of this patent:

UNITED STATES PATENTS

| Number | Name | Date |
|---|---|---|
| 2,193,114 | Seippel | Mar. 12, 1940 |
| 2,336,052 | Anderson | Dec. 7, 1943 |
| 2,432,177 | Seidille | Dec. 9, 1947 |
| 2,472,924 | Schwendner | June 14, 1949 |